(12) United States Patent
Zhang et al.

(10) Patent No.: US 10,278,246 B2
(45) Date of Patent: Apr. 30, 2019

(54) SOLID-STATE LIGHT SOURCE DIMMING SYSTEM AND TECHNIQUES

(71) Applicants: Shiyong Zhang, Boxborough, MA (US); Aaron Ganick, Boxford, MA (US)

(72) Inventors: Shiyong Zhang, Boxborough, MA (US); Aaron Ganick, Boxford, MA (US)

( * ) Notice: Subject to any disclaimer, the term of this patent is extended or adjusted under 35 U.S.C. 154(b) by 0 days.

(21) Appl. No.: 15/898,737

(22) Filed: Feb. 19, 2018

(65) Prior Publication Data

US 2019/0045596 A1 Feb. 7, 2019

Related U.S. Application Data

(63) Continuation of application No. 15/669,190, filed on Aug. 4, 2017, now Pat. No. 9,900,949.

(51) Int. Cl.
*H05B 33/08* (2006.01)
*H05B 41/39* (2006.01)
*H05B 37/02* (2006.01)

(52) U.S. Cl.
CPC ..... *H05B 33/0845* (2013.01); *H05B 33/0809* (2013.01); *H05B 37/0272* (2013.01); *H05B 37/0281* (2013.01)

(58) Field of Classification Search
None
See application file for complete search history.

(56) References Cited

U.S. PATENT DOCUMENTS

| 8,040,070 | B2 | 10/2011 | Myers et al. | |
|---|---|---|---|---|
| 8,536,799 | B1 | 9/2013 | Grisamore et al. | |
| 8,547,034 | B2 | 10/2013 | Melanson | |
| 8,610,365 | B2 | 12/2013 | King | |
| 2012/0139438 | A1* | 6/2012 | Soleno | H05B 33/0815 315/291 |
| 2015/0257216 | A1* | 9/2015 | Lys | H05B 33/0815 315/201 |

* cited by examiner

*Primary Examiner* — Dedei K Hammond
(74) *Attorney, Agent, or Firm* — Hayes Soloway PC

(57) ABSTRACT

A system and related techniques for dimming a solid-state light source are disclosed. The system may be configured to dim the output of a solid-state emitter via a combination of phase-cut dimming and high-frequency pulse-width modulation (PWM) dimming. To this end, the system may include a digital rectification module configured to generate a rectified DC power and a rectified phase-cut signal based on a phase-cut AC signal received from a phase-cut dimmer. The system further may include a microcontroller unit (MCU) configured to measure the duration of low and high states of the rectified phase-cut signal using zero-crossing digital phase-cut detection and output PWM signal(s) based, at least in part, on those measured values. The rectified DC power and PWM signal(s) may be delivered to a DC-to-DC converter, which may output DC power(s) having an intensity based on the rectified DC power and PWM signal(s), causing receiving emitter(s) to dim.

20 Claims, 4 Drawing Sheets

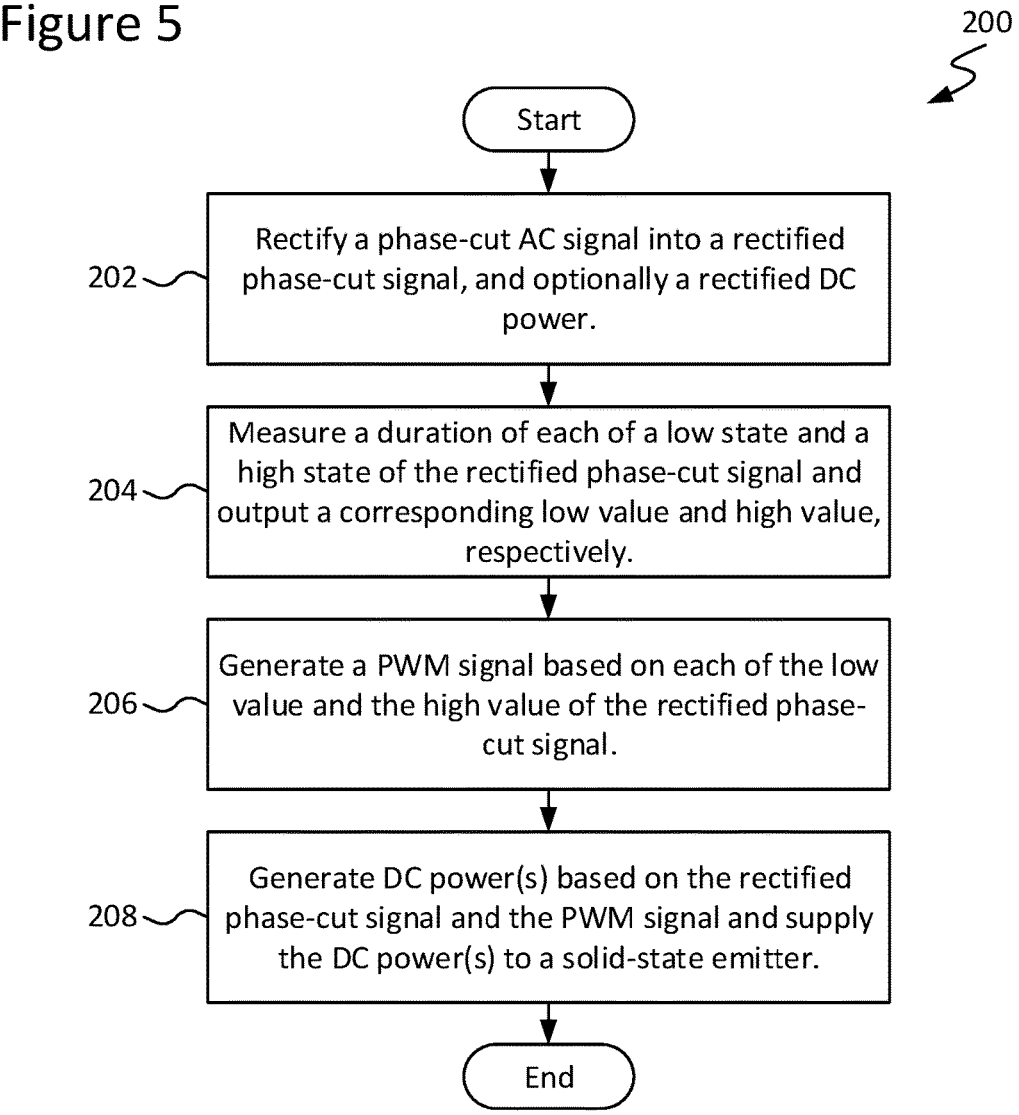

SOLID-STATE LIGHT SOURCE DIMMING SYSTEM AND TECHNIQUES

CROSS-REFERENCE TO RELATED APPLICATIONS AND PRIORITY

This patent application is a continuation of U.S. patent application Ser. No. 15/669,190 filed on Aug. 4, 2017, the entire disclosure of which is incorporated herein by reference.

FIELD OF THE DISCLOSURE

The present disclosure generally relates to solid-state lighting (SSL) and more particularly to dimming a solid-state light source.

BACKGROUND

In many conventional lighting systems, phase-cut dimmers have been implemented to dim light sources. Generally, phase-cut dimmers cut a portion of each half-cycle of the waveform of an alternating current (AC) signal, which is typically of 50 Hz or 60 Hz line frequency, thereby lowering the effective voltage delivered to the downstream light source, lowering the intensity of its output. Phase-cut dimmers typically modify the sinusoidal waveform of an AC signal at either its leading edge or its trailing edge. Forward or leading-edge phase-cut control may be provided, for example, by a triode for alternating current (TRIAC) device. Reverse or trailing-edge phase-cut control may be found, for example, in an electronic low-voltage (ELV) dimmer device. In either case, the electric power to the light-emitting device connected to the dimmer is reduced, and its light output can be dimmed accordingly. Pulse-width modulation (PWM) dimming is an alternative approach to providing dimming control and is of a higher frequency than traditional line-frequency phase-cut dimming, making it especially suitable for solid-state lighting technologies. Typically, PWM dimming of solid-state devices is coordinated by an internal processing element.

BRIEF DESCRIPTION OF THE DRAWINGS

FIG. 5 is a flow diagram illustrating a method of controlling the dimming of a solid-state emitter using phase-cut dimming and high-frequency PWM dimming, in accordance with an embodiment of the present disclosure.

Figure 1:
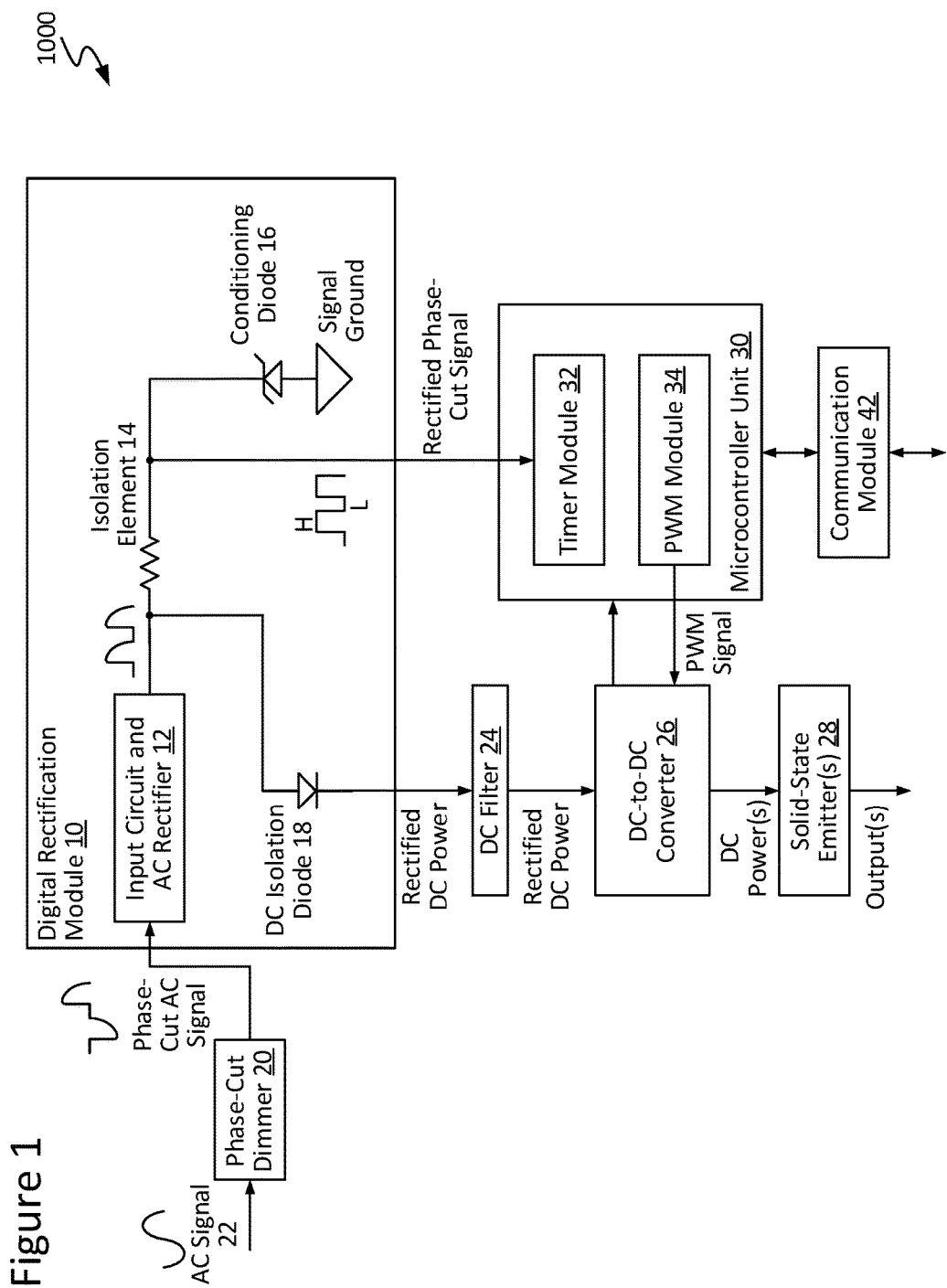
FIG. 1 is a block diagram of a system configured to control the dimming of one or more solid-state emitters via a combination of phase-cut dimming and high-frequency pulse-width modulation (PWM) dimming, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A system and related techniques for dimming a solid-state light source are disclosed. In accordance with some embodiments, the disclosed system may be configured to dim the output of a solid-state emitter via a combination of phase-cut dimming and high-frequency pulse-width modulation (PWM) dimming. To this end, the disclosed system may include a digital rectification module configured to generate a rectified DC and phase-cut signal based on a phase-cut AC signal received from an upstream phase-cut dimmer. The system further may include a microcontroller unit (MCU) configured to measure the duration of low and high states of the rectified phase-cut signal using zero-crossing digital phase-cut detection and output one or more PWM signals based, at least in part, on those measured values. The rectified DC power and PWM signal(s) may be delivered to a downstream DC-to-DC converter, which in turn may output DC power(s) having an intensity based on the rectified DC power and the PWM signal(s) which causes receiving emitter(s) to dim. Numerous configurations and variations will be apparent in light of this disclosure.

General Overview

Many traditional thermal radiation-based, resistive-type lighting systems utilize line-frequency phase-cut dimming circuitry to dim the output of their light sources. Modern smart solid-state lighting elements, however, utilize driving electronics configured to use higher frequency switching power conversion technology to convert low-frequency AC line input to a level suitable to drive solid-state emitters. Unfortunately, the phase-cut waveform generated by phase-cut dimming devices can fail to provide a consistent current to the solid-state emitter(s), leading to erratic and unstable flickering of output, among other performance problems. Therefore, existing phase-cut dimming devices are generally considered incompatible with modern smart solid-state lighting devices, but removal of these legacy dimming elements from existing infrastructure can be a laborious and cost-prohibitive endeavor. Moreover, existing smart solid-state lighting devices and systems that utilize pulse-width modulation (PWM) dimming are often labeled as not to be used or not compatible with such traditional phase-cut dimmers. However, given the prevalence of phase-cut dimmers in existing lighting infrastructure, there is a high likelihood that, despite these warnings, end-users of newer smart lighting devices may attempt to install wirelessly dimmable smart lighting devices into power sockets wired with incompatible phase-cut dimmers. For end-users unfamiliar with the technical difference between smart, wirelessly dimmable and phase-cut dimmable options, disappointment and frustration with the performance of such devices may result. Therefore, as newer solid-state lighting technologies continue to grow in popularity and use, there is an increasing need to develop a way in which legacy phase-cut dimming circuitry can work in concert with the additional smart driving electronics associated with solid-state emitter(s) and related solid-state devices. Thus, and in accordance with some embodiments of the present disclosure, a system and related techniques for dimming a solid-state light source are disclosed. In accordance with some embodiments, the disclosed system may be configured to dim the output of a solid-state emitter via a combination of phase-cut dimming and high-frequency PWM dimming. To this end, the disclosed system may include a digital rectification module configured to generate a rectified DC power and a rectified phase-cut signal based on a phase-cut AC signal received from an upstream phase-cut dimmer. The system further may include a microcontroller unit (MCU) configured to measure the duration of low and high states of the rectified phase-cut signal using zero-crossing digital phase-cut detection and output one or more PWM signals based, at least in part, on those measured values. The rectified DC power and PWM signal(s) may be delivered to a downstream DC-to-DC converter, which in turn may output DC power(s) having an intensity based on the rectified DC power and the PWM signal(s) which causes receiving emitter(s) to dim.

The disclosed system and related techniques may be utilized in any of a wide range of example residential, commercial, and other lighting contexts. In accordance with some embodiments, the disclosed system and related techniques may be implemented in any MCU-based smart lighting device or system, including, for example, wired smart lighting systems and stand-alone lighting systems, power line communication (PLC)-based smart lighting control systems, and wireless smart lighting systems (e.g., such as Z-wave-based, Zigbee-based, Bluetooth classic-based, Bluetooth smart-based, and Wi-Fi-based smart lighting controls, among others), with or without a phase-cut dimmer being present.

In some cases, use of the disclosed system and related techniques may eliminate or otherwise reduce compatibility problems between existing phase-cut dimmer devices and emerging MCU-based smart lighting devices. In some cases, use of the disclosed system and related techniques may provide for a retro-compatible, adaptive, and more flexible dimming option for solid-state lighting devices, while also reducing energy cost and realizing an improved end-user lighting experience. As described herein, the MCU of the disclosed system may serve, in a general sense, as a fine dimmer, generating a waveform which may be used to dim emitter(s) digitally with increased precision as compared to the coarse dimming capabilities provided by any upstream phase-cut dimmer. In accordance with some embodiments, the disclosed system may employ either (or both) a hardware and a software approach to implementing the disclosed techniques, and in at least some instances, this approach may improve noise tolerance and system robustness as compared to existing approaches. In accordance with some embodiments, the disclosed system may be configured to utilize digital technology to detect phase-cut position, which then may be used as input to embedded firmware in determining the digital value of a PWM control signal.

As will be appreciated in light of this disclosure, in using the disclosed system and related techniques to provide compatibility between phase-cut dimmer and digital PWM-based smart lighting devices, additional possibilities may be realized. As a first example, use of the disclosed techniques may realize one or more benefits with respect to cascade dimming, in accordance with some embodiments. Phase-cut dimming and smart dimming may work together in a cascade manner to provide ultra-fine and ultra-low level deep cascade dimming. This may be realized by using the disclosed MCU as part of a power bleeder. In the deep dimming state, the additional smart bleeder coordinated by the MCU may be used.

As a second example, use of the disclosed techniques may realize one or more benefits with respect to power cycling overriding, in accordance with some embodiments. Instead of cascade dimming, the phase-cut dimmer and smart digital PWM dimming controller may be configured to overwrite each other. By implementing the overwriting method(s) inside the smart lighting device, a phase-cut dimmer may overwrite the smart dimming setting of the smart lighting device by using power cycling interruptions. By using additional power cycling, the smart lighting device may be reset back to cascade dimming mode. In some such cases, the actual mode of the smart lighting device and PWM level may be reported to a remote server so that the dimming levels may be tracked and coordinated accordingly. The smart dimming control also may overwrite the light output level determined by the phase-cut dimmer position. This may be implemented by using method(s) to ignore the phase-cut detection result and allow the phase-cut dimmer to deliver its own desired power to the light emitting diodes (on the condition that the phase-cut dimmer still passes sufficient electric energy to the smart light emitting device).

System Architecture and Operation

FIG. 1 is a block diagram of a system 1000 configured to control the dimming of one or more solid-state emitters 28 via a combination of phase-cut dimming and high-frequency pulse-width modulation (PWM) dimming, in accordance with an embodiment of the present disclosure. As can be seen, system 1000 may include a phase-cut dimmer 20. Phase-cut dimmer 20 may be configured, in accordance with some embodiments, to output a phase-cut AC signal based on an AC signal 22 (e.g., such as a 50 Hz or 60 Hz AC electrical signal) received from an upstream source. In some embodiments, phase-cut dimmer 20 may be, for example, a line frequency phase-cut dimmer configured to cut part of each half-cycle of the waveform of AC signal 22. In some such cases, phase-cut dimmer 20 may be configured to utilize either (or both): (1) leading-edge dimming, by which the leading edge of the waveform of AC signal 22 is cut off; or (2) trailing-edge dimming, by which the trailing edge of the waveform of AC signal 22 is cut off. In some cases, phase-cut dimmer 20 may include a variable resistor or other means to control cutting of the waveform of AC signal 22. In some other embodiments, phase-cut dimmer 20 may be, for example, a triode for alternating current (TRIAC) circuit, a silicon-controlled rectifier circuit (SRC), or an insulated-gate bipolar transistor (IGBT) circuit, among others. In some instances, phase-cut dimmer 20 may be a dimming component of a pre-existing lighting infrastructure installed for use, for instance, with incandescent lighting or other non-solid-state legacy lamp componentry, as may be found in residential, commercial, or industrial environments, to name a few. In accordance with some embodiments, phase-cut dimmer 20 may be configured to utilize cascade dimming in dimming AC signal 22. In some such instances, this may provide improved dimming results for emitter(s) 28 (discussed below), especially when the output intensity of AC signal 22 is relatively low. Other suitable configurations for phase-cut dimmer 20 will depend on a given application and will be apparent in light of this disclosure. System 1000 also may include a digital rectification module 10 operatively coupled, directly or indirectly, with the output of upstream phase-cut dimmer 20. Digital rectification module 10 may be configured, in accordance with some embodiments, to generate a rectified DC power and a rectified phase-cut signal based on the phase-cut AC signal received from upstream phase-cut dimmer 20. Digital rectification circuit 10 may be configured, in accordance with some embodiments, to condition the phase-cut signal into: (1) a high state (H) corresponding with the ON phase of upstream phase-cut dimmer 20; and (2) a low state (L) corresponding with the OFF phase of upstream phase-cut dimmer 20.

Digital rectification module 10 may include an input circuit and AC rectifier 12, which may be electrically coupled (e.g., in series) with the output of upstream phase-cut dimmer 20. Input circuit and AC rectifier 12 may be configured, in accordance with some embodiments, to suppress surges and isolate internal and external noise from the waveform of the phase-cut AC signal and generate a rectified DC power and a rectified phase-cut signal based thereon. As desired for a given target application or end-use, input circuit and AC rectifier 12 may be configured for either (or both) half-wave rectification or full-wave rectification and may include any suitable passive and/or active electrical components to those ends, as will be apparent in light of this disclosure. As will be appreciated in light of this disclosure, many solid-state emitters and solid-state lighting devices already may include an AC rectifier at the input stage of their electronic drivers, and therefore such pre-existing AC rectifier components optionally may be utilized, in accordance with some embodiments, in addition to or as an alternative to input circuit and AC rectifier 12. Other suitable configurations for input circuit and AC rectifier 12 will depend on a given application and will be apparent in light of this disclosure.

Digital rectification module 10 also may include an isolation element 14, a conditioning diode 16, and a DC isolation diode 18, each of which may be configured to provide digital rectification module 10 with a given desired degree of waveform conditioning. Isolation element 14 may be, for example, a current-limiting resistor, a coupling capacitor, or both a resistor and capacitor in serial or parallel configuration, and may be electrically coupled (e.g., in series) with the output of upstream input circuit and AC rectifier 12. Conditioning diode 16 may be, for example, a Zener diode or other voltage-limiting diode and may be electrically coupled (e.g., in parallel) with the output of upstream isolation element 14 and the input of downstream microcontroller unit (MCU) 30 (discussed below). DC isolation diode 18 may be configured to isolate the rectified phase-cut signal from interference effects that otherwise might result from downstream reactive energy storage component(s), such as may be present from downstream DC filter 24 and DC-to-DC convertor 26 (each discussed below), thereby helping to maintain the integrity of the waveform of the rectified phase-cut signal output by upstream input circuit and AC rectifier 12. DC isolation diode 18 may be electrically coupled with: (1) the output of upstream input circuit and AC rectifier 12; and (2) in parallel with the input of isolation element 14. Other suitable configurations for isolation element 14, conditioning diode 16, and DC isolation diode 18 will depend on a given application and will be apparent in light of this disclosure.

System 1000 further may include a DC filter 24 operatively coupled, directly or indirectly, with the output of upstream digital rectification module 10. DC filter 24 may be configured, in accordance with some embodiments, to filter inference, noise, and/or signals of a given frequency from the rectified DC power received from upstream digital rectification module 10. To that end, DC filter 24 may include any one, or combination, of low-pass, high-pass, and band-pass DC filter circuitry of any suitable configuration, as will be apparent in light of this disclosure. Other suitable configurations for DC filter 24 will depend on a given application and will be apparent in light of this disclosure.

System 1000 also may include a DC-to-DC converter 26 operatively coupled, directly or indirectly, with the output of upstream DC filter 24. DC-to-DC converter 26 may be configured, in accordance with some embodiments, to receive: (1) a rectified DC power from upstream DC filter 24; and (2) one or more high-frequency PWM signals from upstream MCU 30. DC-to-DC converter 26 may be configured, in accordance with some embodiments, to convert the rectified DC power from a first voltage and/or current level to a second voltage and/or current level based on the PWM signal(s) and to output DC power(s) to downstream solid-state emitter(s) 28 (discussed below). The output DC power(s) may be based, at least in part, on the duty cycle of the PWM signal(s) received from PWM module 34 (discussed below) of MCU 30. To these ends, DC-to-DC converter 26 may be a linear or switched converter, a step-down (buck) converter, or any other suitable DC-to-DC conversion circuitry, as will be apparent in light of this disclosure. Other suitable configurations for DC-to-DC converter 26 will depend on a given application and will be apparent in light of this disclosure.

System 1000 further may include one or more solid-state emitters 28 operatively coupled, directly or indirectly, with the output of upstream DC-to-DC converter 26. Emitter(s) 28 may be configured, in accordance with some embodiments, to receive the DC power(s) output by upstream DC-to-DC converter 26 and emit electromagnetic radiation (e.g., light) from any one, or combination, of spectral bands, such as, for example, the visible spectral band, the infrared (IR) spectral band, and the ultraviolet (UV) spectral band, among others. A given emitter 28 may be a semiconductor light source, such as a light-emitting diode (LED), an organic light-emitting diode (OLED), or a polymer light-emitting diode (PLED), among others. As will be appreciated in light of this disclosure, emitter(s) 28 may be hosted, for example, by a solid-state lamp, luminaire, or other solid-state light source. Other suitable configurations for emitter(s) 28 will be apparent in light of this disclosure.

Figure 2:
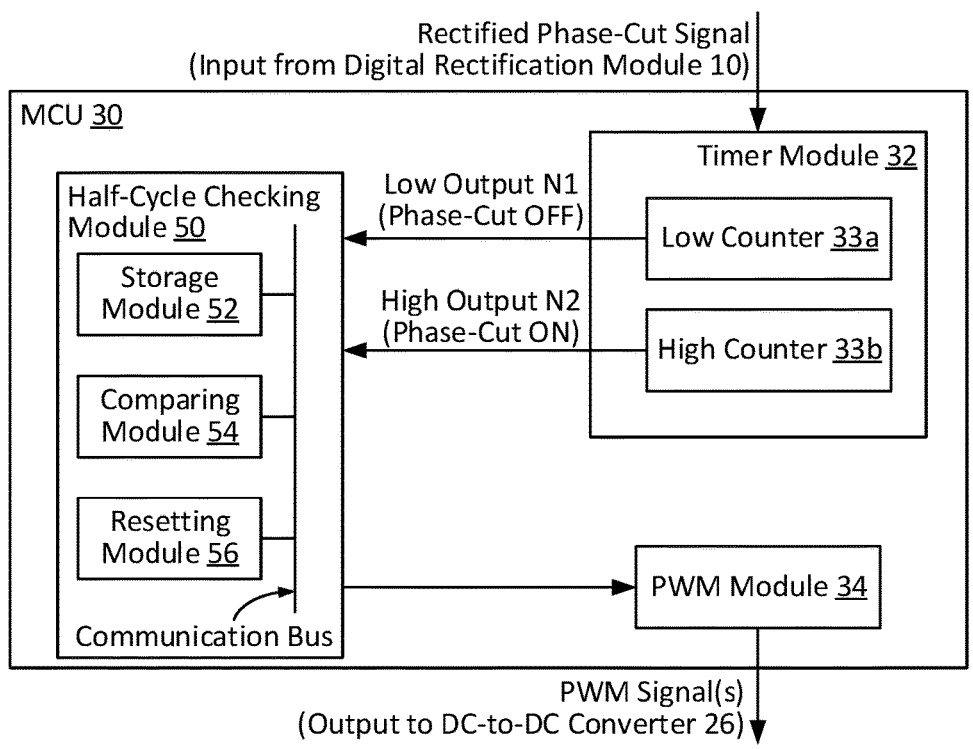
FIG. 2 is a block diagram of a microcontroller unit (MCU) configured in accordance with an embodiment of the present disclosure.

System 1000 further may include a microcontroller unit (MCU) 30 operatively coupled, directly or indirectly, with the output of upstream digital rectification module 10. FIG. 2 is a block diagram of an MCU 30 configured in accordance with an embodiment of the present disclosure. MCU 30 may be configured, in accordance with some embodiments, to provide processing capabilities for system 1000 and, to that end, may include a processor core, memory, and one or more programmable input/output ports. In some cases, MCU 30 may include additional elements, such as, for example, analog-to-digital converter (ADC) componentry and one or more interrupt controls, among others. In some embodiments, MCU 30 may be configured to serve as a current bleeder, improving the load current to an intensity that allows for deeper, low-intensity dimming, particularly when the rectified DC power received from upstream digital rectification module 10 has a relatively low intensity. In some embodiments, MCU 30 may be configured to utilize cascade dimming in dimming the rectified DC power, thereby providing improved dimming results for emitter(s) 28, especially when the output intensity of the rectified DC power received from upstream digital rectification module 10 is relatively low.

MCU 30 may include a timer module 32, which may be operatively coupled, directly or indirectly, with the output of upstream digital rectification module 10. As will be appreciated in light of this disclosure, the rectified phase-cut signal received by MCU 30 from upstream digital rectification module 10 may be of a substantially square waveform, with the high states (H) representing the ON phase of phase-cut dimmer 20 and the low states (L) representing the OFF phase of phase-cut dimmer 20. Timer module 32 may be configured, in accordance with some embodiments, to measure zero-cross behavior of the waveform of the rectified phase-cut signal received from upstream digital rectification module 10. In some embodiments, timer module 32 may include two built-in, consecutive, programmable gate-controlled digital clock pulse counters—a low counter 33a and a high counter 33b—configured to measure the zero-crossing behavior of the rectified phase-cut signal generated from the original phase-cut AC signal received by digital rectification module 10.

Figure 3:
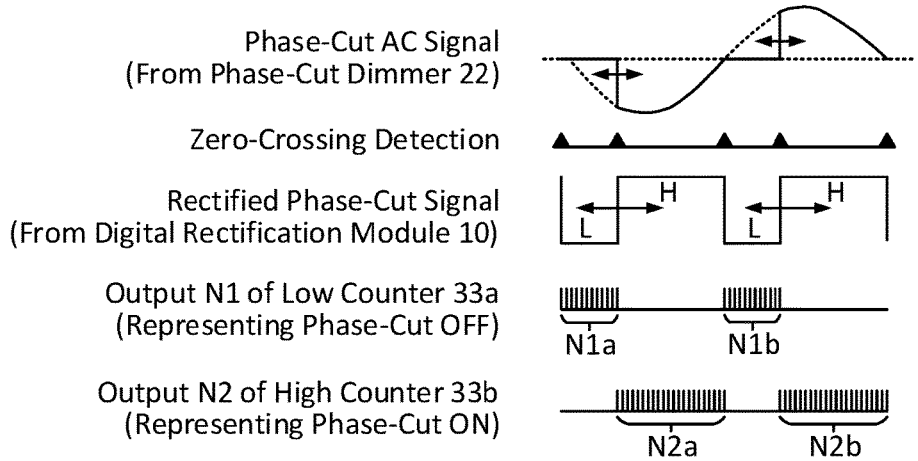
FIG. 3 illustrates timing diagrams for zero-crossing detection and counting via a low counter and a high counter in relation to an example phase-cut alternating current (AC) signal, in accordance with an embodiment of the present disclosure.

FIG. 3 illustrates timing diagrams for zero-crossing detection and counting via a low counter 33a and a high counter 33b in relation to an example phase-cut AC signal, in accordance with an embodiment of the present disclosure. As will be appreciated in light of this disclosure, zero-cross detection may include detecting when the voltage of the subject waveform rises or falls to zero. Timer module 32 may be configured, in accordance with some embodiments, to sample the rectified phase-cut signal at a sampling frequency designated by MCU 30.

Low counter 33a may be configured, in accordance with some embodiments, to measure the duration of a low value (L), starting at falling edges of the waveform of the rectified phase-cut signal received from upstream digital rectification module 10. As generally shown in FIG. 3, the output of low counter 33a may be provided as N1, representing periods of the OFF phase of phase-cut dimmer 20. During a half-cycle period (or other desired period) of the rectified phase-cut signal received by MCU 30, low counter 33a may count instances where phase-cutting is OFF (corresponding to a low state of the signal), as generally illustrated by N1a and N1b.

High counter 33b may be configured, in accordance with some embodiments, to measure the duration of a high value (H), starting at rising edges of the waveform of the rectified phase-cut signal received from upstream digital rectification module 10. As generally shown in FIG. 3, the output of high counter 33b may be provided as N2, representing periods of the ON phase of phase-cut dimmer 20. During a half-cycle period (or other desired period) of the rectified phase-cut signal received by MCU 30, high counter 33b may count instances where phase-cutting is ON (corresponding to a high state of the signal), as generally illustrated by N2a and N2b.

Thus, timer module 32 may determine the low value to be the number of instances counted by the low counter 33a and the high value to be the number of instances counted by the high counter 33b. At the end of the pre-determined period, timer module 32 may stop counters 33a, 33b and output the current low value and high value to PWM module 34 (discussed below). Timer module 32 then may reset counters 33a, 33b to begin counting at the beginning of a subsequent pre-determined period. Programming of counters 33a, 33b may be provided via control bit setting for MCU 30. Other suitable configurations for timer module 32 and its counters 33a, 33b will depend on a given application and will be apparent in light of this disclosure.

MCU 30 also may include a half-cycle checking module 50, which may be operatively coupled, directly or indirectly, with the output of timer module 32 and the input of PWM module 34 (discussed below). Half-cycle checking module 50 may be configured, in accordance with some embodiments, to eliminate (or otherwise reduce) undesired fluctuations of either (or both) the low value or the high value due to noise or external interference, for example. Thus, at least in some instances, half-cycle checking module 50 may serve to improve the noise tolerance and increase the robustness of system 1000. To such end, half-cycle checking module 50 may utilize a data smoothing routine, in accordance with some embodiments.

Half-cycle checking module 50 may include a storage module 52. Storage module 52 may be configured, in accordance with some embodiments, to store data pertaining to either (or both): (1) an accepted low value relating to the rectified phase-cut signal received from digital rectification module 10; or (2) an accepted high value relating to the rectified phase-cut signal received from digital rectification module 10. Storage module 52 further may be configured, in accordance with some embodiments, to store data pertaining to an accepted half-cycle period (or other accepted period) relating to system 1000. In some cases, the accepted half-cycle period may be, for example, equal to the clock frequency of MCU 30 divided by twice the frequency of AC signal 22. It should be noted, however, that storage module 52 is not limited to storing only these data, as in accordance with some other embodiments, additional and/or different data may be stored by storage module 52, as desired for a given target application or end-use. It should be further noted that as used herein, a value or period may be considered accepted, for example, if either (or both): (1) it passes the analysis conducted by comparing module 54 (discussed below with respect to FIG. 4); or (2) is designated as accepted by a user or other external source (e.g., via communication module 42, discussed below).

Half-cycle checking module 50 also may include a comparing module 54. Comparing module 54 may be configured, in accordance with some embodiments, to compare various values received from timer module 32 and stored by storage module 52. For instance, comparing module 54 may compare either (or both) the low value or the high value, as received from timer module 32, against the half-cycle period of the rectified phase-cut signal. Comparing module 54 also may compare either (or both) the sum of the low and high values or the difference of the low and high values, as received from timer module 32, against the half-cycle period of the rectified phase-cut signal. In some instances, comparing module 54 may compare the low and high values against the half-cycle period with a predetermined margin ($\Delta$), as to allow values within that margin to be considered accepted, if desired. In addition, comparing module 54 may be configured to compare the low value, as received from timer module 32, against the accepted low value, as stored by storage module 52. Similarly, comparing module 54 may be configured to compare the high value, as received from timer module 32, against the accepted high value, as stored by storage module 52.

Half-cycle checking module 50 further may include a resetting module 56. Resetting module 56 may be configured, in accordance with some embodiments, to reset either (or both) the low value and the high value if certain conditions are met, as discussed further below with respect to FIG. 4. If the low value materially exceeds the half-cycle period (optionally with margin), then resetting module 56 may reset the low value. Similarly, if the high value materially exceeds the half-cycle period (optionally with margin), then resetting module 56 may reset the high value. If comparing module 54 determines any one of the (1) low value, (2) high value, (3) sum of the low and high values, or (4) difference of the low and high values to be accepted, then resetting module 56 may not reset that value (or values), and instead those value(s) may be delivered to PWM module 34

(discussed below). If any of the (1) low value, (2) high value, (3) sum of the low and high values, or (4) difference of the low and high values is not deemed accepted by comparing module 54, then resetting module 56 may reset either (or both) the low value or the high value. Resetting module 56 may utilize accepted low and high values stored in storage module 52 to reset unaccepted low and high values, respectively.

Figure 4:
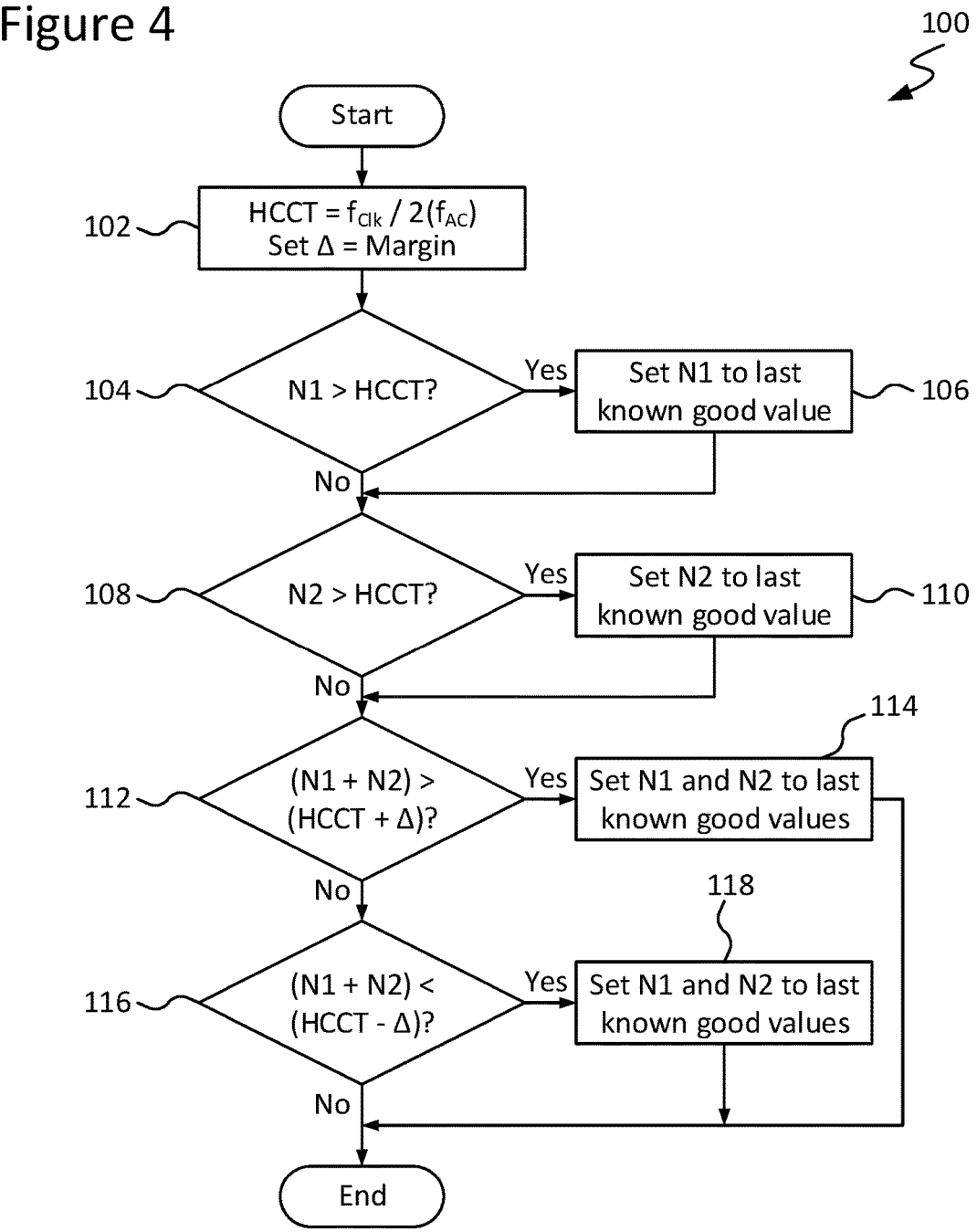
FIG. 4 is a flow diagram illustrating a method of half-cycle checking which may be utilized by a half-cycle checking module of an MCU, in accordance with an embodiment of the present disclosure.

FIG. 4 is a flow diagram illustrating a method 100 of half-cycle checking which may be utilized by half-cycle checking module 50 of MCU 30, in accordance with an embodiment of the present disclosure. Method 100 may begin as in block 102 with determining the half-cycle period (HCCT) and optionally setting the margin ($\Delta$). In accordance with an embodiment, the HCCT may be equal to the clock frequency ($f_{Clk}$) used by counters 33a, 33b of MCU 30 divided by twice the line frequency ($f_{AC}$) of AC signal 22. Thus, if AC signal 22 has a line frequency of 60 Hz, then the HCCT will be equal to $f_{Clk}$/120 Hz. Similarly, if AC signal 22 instead has a line frequency of 50 Hz, then the HCCT will be equal to $f_{Clk}$/100 Hz. The optional margin ($\Delta$) value may be customized, as desired for a given target application or end-use.

Method 100 may continue as in block 104 with comparing the low value N1 against the HCCT. If the low value N1 is greater than the HCCT, then the low value N1 may be reset to the last known good value for N1, as in block 106, and method 100 may proceed as in block 108, discussed below. The last known good value for N1 may represent the minimum accepted low value for N1, which may be customized. If instead the low value N1 is less than or equal to the HCCT, then the low value N1 may not be reset, and method 100 may proceed as in block 108, discussed below.

Method 100 may continue as in block 108 with comparing the high value N2 against the HCCT. If the high value N2 is greater than the HCCT, then the high value N2 may be reset to the last known good value for N2, as in block 110, and method 100 may proceed as in block 112, discussed below. The last known good value for N2 may represent the maximum accepted high value for N2, which may be customized. If instead the high value N2 is less than or equal to the HCCT, then the high value N2 may not be reset, and method 100 may proceed as in block 112, discussed below.

Method 100 may continue as in block 112 with comparing the sum of the low value N1 and the high value N2 against the sum of the HCCT and the margin. If the sum of the low value N1 and the high value N2 is greater than the sum of the HCCT and the margin, then the low value N1 and the high value N2 may be reset to the last known good values for N1 and N2, as in block 114, and method 100 may proceed as in block 116, discussed below. If instead the sum of the low value N1 and the high value N2 is less than or equal to the sum of the HCCT and the margin, then the low value N1 and the high value N2 may not be reset, and method 100 may proceed as in block 116.

Method 100 may continue as in block 116 with comparing the sum of the low value N1 and the high value N2 against the difference of the HCCT and the margin. If the sum of the low value N1 and the high value N2 is less than the difference of the HCCT and the margin, then the low value N1 and the high value N2 may be reset to the last known good values for N1 and N2, as in block 118, and method 100 may terminate. If instead the sum of the low value N1 and the high value N2 is greater than or equal to the difference of the HCCT and the margin, then the low value N1 and the high value N2 may not be reset, and method 100 may terminate.

As will be appreciated in light of this disclosure, determining whether to reset the high value N2 and/or the low value N1 may be accomplished in any order in method 100, as desired for a given target application or end-use. In accordance with some embodiments, short history data may be used to eliminate (or otherwise reduce) sudden jumping of the low value N1 and the high value N2 being measured. In some cases, this can be used in conjunction with one or more suitable data smoothing routines, as will be apparent in light of this disclosure.

Depending on the results of applying method 100, a low value N1 and a high value N2 may be output to PWM module 34 (discussed below). If comparing module 54 determines that any of (1) a low value, (2) a high value, (3) a sum of the low and high values, or (4) a difference of the low and high values materially exceeds the half-cycle period (optionally with margin), then resetting module 56 may either (or both) replace the low value with the accepted low value stored by storage module 52 or replace the high value with the accepted high value stored by storage module 52. If resetting module 56 replaces the low value with the accepted low value, then half-cycle checking module 50 may output the accepted low value to PWM module 34. Similarly, if resetting module 56 replaces the high value with the accepted high value, then half-cycle checking module 50 may output the accepted high value to PWM module 34. Resetting a high value or low value that materially exceeds the acceptable half-cycle period may allow for the system 1000 to prevent undesired increases in measured values due to noise or interference, for example. In this manner, half-cycle checking module 50 may serve to increase the robustness of system 1000 and may help to prevent or otherwise reduce the opportunity for undesired changes in the second waveform.

In accordance with some embodiments, MCU 30 may be configured for power cycling overriding. For instance, MCU 30 may be configured to power cycle itself entirely or, if desired, a given one of only its various modules (e.g., such as PWM module 34, discussed below). To that end, MCU 30 may utilize interrupts, counters, or may be power cycled remotely. If, for instance, MCU 30 is triggered to power cycle, then for a predetermined duration during the power cycling, PWM module 34 may not output a PWM signal to DC-to-DC converter 26. DC-to-DC converter 26 then may output DC power(s) to emitter(s) 28 with an intensity based on a previously received PWM signal. In another example, if MCU 30 is power cycled such that it may not receive a signal from communication module 42, then PWM module 34 may output a PWM signal without considering any signal transmitted by communication module 42 (discussed below). Power cycling overriding of MCU 30 may allow for a PWM waveform to be generated based on the low and high values measured by timer module 32 or, in some cases, the output from half-cycle checking module 50.

As previously noted, MCU 30 may include a PWM module 34, which may be operatively coupled, directly or indirectly, with upstream half-cycle checking module 50 and downstream DC-to-DC converter 26. PWM module 34 may be configured, in accordance with some embodiments, to receive from upstream half-cycle checking module 50 any one (or combination) of the low value, the high value, the accepted low value, and the accepted high value. From these received value(s), which are based on the rectified phase-cut signal received by MCU 30 from digital rectification module 10, PWM module 34 may generate one or more high-frequency PWM signals, which may be provided, directly or indirectly, to DC-to-DC converter 26. A given PWM signal output by PWM module 34 may have a duty cycle based, at least in part, on the value(s) received from half-cycle checking module 50 and may be indicative of the desired output DC power(s) of DC-to-DC converter 26, serving to limit the DC voltage(s) and/or current(s) received by downstream emitter(s) 28. In accordance with some embodiments, PWM module 34 may generate a PWM signal of a waveform including about a 50% duty cycle based on the value(s) received from half-cycle checking module 50. In accordance with some embodiments, PWM module 34 may be configured to adjust its high-frequency PWM signal output as it receives value(s) from half-cycle checking module 50, changing at a frequency less than or equal to the clock frequency of MCU 30.

In accordance with some other embodiments, PWM module 34 also may be operatively coupled, directly or indirectly, with communication module 42 (discussed below). In this manner, PWM module 34 may receive a control signal or other signal from a remote source via communication module 42 and, in response to that signal, adjust its PWM signal output. In some cases, PWM module 34 may generate a PWM control signal based solely on input from a remote source (e.g., such as may be received via communication module 42), provided that the PWM signal represents an intensity less than a maximum intensity of the rectified DC power. Notwithstanding any communication with communication module 42, if the value(s) received by PWM module 34 from half-cycle checking module 50 are equal, then that condition may represent the state where the intensity of emitter(s) 28 is about half (e.g., about 50%) of the maximum emitter intensity possible. If, however, PWM module 34 instead receives a control signal from communication module 42 that represents a desired dimming intensity, for example, of 30% of the maximum intensity of the rectified DC power, provided that that waveform is of sufficient power to achieve 30% maximum intensity, then PWM module 34 may output a PWM signal representing an intensity of about 30% of the maximum intensity of the rectified DC power. If, however, the rectified DC power is not of sufficient power to support the desired 30% of maximum intensity, then emitter(s) 28 may emit light with an intensity representing the intensity of that rectified DC power. Other suitable configurations for PWM module 34 will depend on a given application and will be apparent in light of this disclosure.

As previously noted, system 1000 optionally may include a communication module 42, which may be operatively coupled, directly or indirectly, with MCU 30. Communication module 42 may be configured, in accordance with some embodiments, to enable communication between MCU 30 and one or more remote entities external to system 1000. In some instances, communication module 42 may be configured to communicate with an external network, server, database, or computing device, which may transmit data to and/or receive data from MCU 30 (or other portion of system 1000). To such ends, communication module 42 may be configured as a transmitter, a receiver, or both (i.e., a transceiver). Communication module 42 may be configured for wired or wireless communication (or both) utilizing any one, or combination, of suitable means, such as Universal Serial Bus (USB), Ethernet, FireWire, Wi-Fi, Bluetooth, or ZigBee, among others. In some cases, communication module 42 may be separate and distinct from MCU 30 (e.g., as generally shown in FIG. 1), though in some other cases, communication module 42 may be a component of or otherwise integrated with MCU 30.

In accordance with some embodiments, MCU 30 may be configured to output PWM signal(s) to emitter(s) 28 based, at least in part, on input received from a remote source, such as a control interface communicating through communication module 42. The control interface may be physical, virtual, or a combination thereof and may be configured to communicate with MCU 30 (via intervening communication module 42), which in turn interprets input received from the control interface and distributes desired PWM signal(s) to DC-to-DC converter 26, which in turn supplies DC power to emitter(s) 28. In accordance with some embodiments, communication module 42 may be used in remotely, digitally controlling the PWM signal waveform generated by PWM module 34. For instance, a remote source may output a control signal which is relayed by communication module 42 to MCU 30, and MCU 30 in turn may instruct its PWM module 34 to output a PWM signal based, at least in part, on data provided in that control signal received from communication module 42. Other suitable configurations for communication module 42 will depend on a given application and will be apparent in light of this disclosure.

In accordance with some embodiments, communication module 42 may relay a control signal to MCU 30 to cause PWM module 34 to output a PWM signal having a waveform representing a function of the waveform of the rectified phase-cut signal received from digital rectification module 10. For example, if (1) communication module 42 transmits a signal to PWM module 34 that indicates a desire to output a PWM signal having a waveform with an intensity that is about 50% less than the intensity of the rectified DC power, and (2) timer module 32 measures low and high values of the rectified phase-cut signal waveform that represent about 40% of the maximum intensity possible, then (3) PWM module 34 may output a PWM signal having a waveform representing an intensity of about 20% of the maximum intensity, which substantially equates to 50% less than the 40% of the maximum intensity of the rectified DC power. Continuing the present example, if (1) phase-cut dimmer 20 and digital rectification module 10 subsequently change the waveform of the rectified phase-cut signal to 30% of the maximum intensity possible, and (2) timer module 32 measures low and high values of the rectified phase-cut signal waveform that represent about 30% of the maximum intensity possible, then (3) PWM module 34 may output a PWM signal having a waveform representing an intensity of about 15% of the maximum intensity, which substantially equates to 50% less than the 30% of the maximum intensity of the rectified DC power.

As previously noted, in some instances, communication module 42 may be configured to communicate with a remote server. In this manner, MCU 30 may transmit data pertaining to its present mode of operation to the remote server so that the present dimming levels and settings of system 1000 may be recorded and coordinated by the remote server. In some cases, data pertaining to the characteristics of the PWM signal(s) output by PWM module 34 may be transmitted by communication module 42 to the remote server, where they may be stored.

As previously explained, counters 33a, 33b may be configured to measure the zero-cross behavior of the rectified phase-cut signal generated by digital rectification module 10 from the phase-cut AC signal output by phase-cut dimmer 20. Counter 33a may measure the duration of the low state and report its results as N1, which corresponds with the OFF phase of the phase-cut. Counter 33b may measure the duration of the high state and report its results as N2, which corresponds with the ON phase of the phase-cut. In accordance with some embodiments, the angular phase position of phase-cut dimmer 20 can be calculated via the following relationship:

$$\text{Angular PhaseCut Position} = \left(\frac{N1}{(N1+N2)}\right) \times 180.$$

Because N1 and N2 are both in digital format, the digital result may be used directly by PWM module 34 in generating one or more PWM signals, in accordance with some embodiments. However, with this approach to digitally calculating angular phase-cut position, there are two degenerated states: (1) when N1 is virtually zero (e.g., the full bright state); and (2) when N2 is virtually zero (e.g., the full dim state). When N1 is virtually zero, N2 mathematically becomes perpetual, though the perpetual state of N2 will not actually occur because the zero-crossing detection output will stop the N2 counter after that active half-cycle is over. For the same reason, the second half-cycle following that active N2 half-cycle can be mistakenly treated as N1, and the degenerated real no-phase-cut can be interpreted erroneously as a 50% (e.g., 90°) phase-cut. The full dim state (where N2 is virtually zero) can have consequences like those of the full bright state, discussed above. Because of the sequential nature of N1 and N2, it may not be so straightforward for MCU 30 to tell which one is which when implementing the described zero-crossing approach. If not properly addressed, the brighten and dim functions could be reversed, and system 1000 could become unstable. Thus, to address these non-trivial complications, a different approach may be employed, measuring only the high state H via high counter 33b first. Because the sum of the low state L and the high state H is the half-period of the AC signal 22, one can obtain the angular phase-cut position by calculating $$\left(\frac{(T_{AC} - T_H)}{T_{AC}}\right) \times 180,$$

where $T_{AC}$ is either 20 msec (e.g., if the frequency of AC signal 22 is 50 Hz) or 16.66 msec (e.g., if the frequency of AC signal 22 is 60 Hz), and $T_H$ relates to the high state H. $T_{AC}$ may be measured directly by counting the time interval between the same edges (i.e., either rising edges or falling edges) of the rectified phase-cut signal output of digital rectifier module 10. Because the falling and rising edges are well-processed, there may be no need to use consecutive control. In this manner, the zero-phase degenerate and N1 and N2 confusions, each discussed above, may be eliminated, in accordance with some embodiments.

In an example case of a smart lighting platform utilizing a CC2530 Second Generation System-on-Chip (SoC) device, available from Texas Instruments, Inc., the Timer 4 channel 0 was utilized to measure H and (L+H), and the digital rectifier output was wired to P2.0 (PERCFG.T4CFG<-alt.2). The Timer 4 was setup for edge-trigger capture interrupt mode, and the counter was reset to zero at the rising edge. With this setup, once a digital level change edge was detected, the interrupt routine checked the internal register that contains a snapshot of the respective timer and counter registers at the moment of the trigger. By subtracting successive trigger timestamps, the duration of H and the period (e.g., the sum of L and H) may be calculated accordingly. The results may be further checked against the half-cycle period and the last known good values for data integrity and consistency.

Methodology

FIG. 5 is a flow diagram illustrating a method 200 of controlling the dimming of a solid-state emitter using phase-cut dimming and high-frequency PWM dimming, in accordance with an embodiment of the present disclosure. Method 200 may begin as in block 202 with rectifying a phase-cut AC signal into a rectified phase-cut signal, and optionally a rectified DC power. In some cases, the phase-cut AC signal may be rectified, more generally, into at least one of a rectified phase-cut signal and a rectified DC power. In accordance with some embodiments, rectification may be provided by a digital rectification module 10, as discussed above.

Method 200 may continue as in block 204 with measuring a duration of each of a low state and a high state of the rectified phase-cut signal and outputting corresponding low and high values, respectively. In accordance with some embodiments, such measuring may be provided by a timer module 32 (e.g., having a low counter 33a and a high counter 33b), as discussed above. The measuring may involve zero-crossing detection, where the low value is measured starting at a falling edge of the rectified phase-cut signal and the high value is measured starting at a rising edge of the rectified phase-cut signal.

Method 200 may continue as in block 206 with generating a PWM signal based on each of the low value and the high value of the rectified phase-cut signal. In accordance with some embodiments, such generating may be provided by a PWM module 34, as discussed above. Method 200 may continue as in block 208 with generating a DC power(s) based on the rectified DC power and the PWM signal and supplying the DC power(s) to solid-state emitter(s). In accordance with some embodiments, the generating may be provided by a DC-to-DC converter 26, as discussed above. One or more emitters 28, as discussed above, may receive the DC power(s) and emit light in response.

In accordance with some embodiments, the PWM signal generated in block 206 may be modified based on input received from an external source. For instance, as discussed above, a communication module 42 may relay information to MCU 30, which instructs PWM module 34 to adjust its PWM signal output. In some instances, the PWM signal may be modified as a function of the duration of the rectified phase-cut signal generated in block 202. In accordance with some embodiments, in generating the PWM signal in block 206, method 200 may include modifying the PWM signal based on input received by communication module 42 when the output DC power(s) corresponding to the rectified phase-cut signal are greater than the output DC power(s) designated in the signal received by communication module 42.

In accordance with some embodiments, after measuring the duration of the low and high values in block 204, method 200 may include storing a half-cycle period and an accepted high value and an accepted low value of the rectified phase-cut signal. In generating the PWM signal in block 206, method 200 may include comparing the accepted high value and the accepted low value against the half-cycle period of the rectified phase-cut signal. In generating the PWM signal in block 206, method 200 may include resetting the low and high values utilizing the accepted low and high values, respectively, when a sum or a difference of the accepted low and high values exceeds the half-cycle period.

Numerous embodiments will be apparent in light of this disclosure. One example embodiment provides a system for controlling the dimming of a solid-state light source. The system includes a digital rectification module configured to rectify a phase-cut alternating current (AC) signal into: a rectified direct current (DC) power; and a rectified phase-cut signal. The system further includes a microcontroller configured to receive the rectified phase-cut signal. The microcontroller includes a timer module configured to: measure, within a given period, a duration of a low state of the rectified phase-cut signal and output a low value based thereon; and measure, within the given period, a duration of a high state of the rectified phase-cut signal and output a high value based thereon. The microcontroller further includes a PWM module configured to generate a pulse-width modulation (PWM) signal based on at least one of the low value and the high value. In some cases, the digital rectification module includes an input circuit and AC rectifier configured to receive the phase-cut AC signal from a phase-cut dimmer. In some such cases, the digital rectification module further includes: an isolation element electrically coupled in series with the input circuit and AC rectifier; a conditioning diode electrically coupled in series with the isolation element; and an isolation diode electrically coupled in series with the input circuit and AC rectifier and in parallel with the isolation element. In some instances, the timer module is configured to utilize zero-crossing detection in measuring each of the duration of the low state and the duration of the high state of the rectified phase-cut signal. In some such instances: the duration of the low state is measured starting at a falling edge of the rectified phase-cut signal; and the duration of the high state is measured starting at a rising edge of the rectified phase-cut signal. In some cases: the microcontroller further includes a half-cycle checking module configured to compare the low value and the high value against an accepted low value and an accepted high value, respectively; and the PWM module is configured to generate the PWM signal based on at least one of the low value, the high value, the accepted low value, and the accepted high value. In some such cases, the half-cycle checking module includes a storage module configured to store the accepted low value and the accepted high value of the rectified phase-cut signal. The half-cycle checking module also includes a comparing module configured to: compare the low value against a half-cycle period of the rectified phase-cut signal; and compare the high value against the half-cycle period of the rectified phase-cut signal. The half-cycle checking module further includes a resetting module configured to: reset the low value with the accepted low value if the low value exceeds the accepted low value; and reset the high value with the accepted high value if the high value exceeds the accepted high value. In some instances, the system further includes a communication module configured to communicate with the microcontroller and a remote device external to the system, wherein the PWM module is further configured to generate the PWM signal based on input received via the communication module. In some cases, the system further includes a DC filter configured to filter the rectified DC power output by the digital rectification module. In some instances, the system further includes a DC-to-DC converter configured to: receive the rectified DC power from the digital rectification module; receive the PWM signal from the PWM module; and generate at least one DC power based on the rectified DC power and the PWM signal and supply the at least one DC power to the solid-state light source.

Another example embodiment provides a method of controlling light output of a solid-state light source. The method includes rectifying a phase-cut alternating current (AC) signal into: a rectified DC power; and a rectified phase-cut signal. The method also includes measuring a duration of each of a low state and a high state of the rectified phase-cut signal and outputting a corresponding low value and high value, respectively. The method also includes generating a pulse-width modulation (PWM) signal based on each of the low value and the high value of the rectified phase-cut signal. The method also includes generating at least one direct current (DC) power based on the rectified DC power and the PWM signal and supplying the at least one DC power to the solid-state light source. In some cases, rectifying the phase-cut AC signal is performed via a digital rectification module including an input circuit and AC rectifier configured to receive the phase-cut AC signal from a phase-cut dimmer. In some such cases, the digital rectification module further includes: an isolation element electrically coupled in series with the input circuit and AC rectifier; a conditioning diode electrically coupled in series with the isolation element; and an isolation diode electrically coupled in series with the input circuit and AC rectifier and in parallel with the isolation element. In some instances, measuring the duration of each of the low state and the high state of the rectified phase-cut signal and outputting the corresponding low value and high value are performed via a microcontroller configured to receive the rectified phase-cut signal. The microcontroller includes a timer module configured to: measure, within a given period, the duration of the low state and output the low value based thereon; and measure, within the given period, the duration of the high state and output the high value based thereon. The microcontroller also includes a half-cycle checking module configured to compare the low value and the high value against an accepted low value and an accepted high value, respectively. In some such instances, generating the PWM signal based on each of the low value and the high value of the rectified phase-cut signal is performed via the microcontroller, wherein the microcontroller further includes a PWM module configured to generate the PWM signal based on at least one of the low value, the high value, the accepted low value, and the accepted high value. In some cases, the timer module is configured to utilize zero-crossing detection in measuring each of the duration of the low state and the duration of the high state of the rectified phase-cut signal. In some such cases, the duration of the low state is measured starting at a falling edge of the rectified phase-cut signal; and the duration of the high state is measured starting at a rising edge of the rectified phase-cut signal. In some instances, the half-cycle checking module includes a storage module configured to store the accepted low value and the accepted high value of the rectified phase-cut signal. The half-cycle checking module also includes a comparing module configured to: compare the low value against a half-cycle period of the rectified phase-cut signal; and compare the high value against the half-cycle period of the rectified phase-cut signal. The half-cycle checking module further includes a resetting module configured to: reset the low value with the accepted low value if the low value exceeds the accepted low value; and reset the high value with the accepted high value if the high value exceeds the accepted high value. In some cases, generating the PWM signal is further based on input received from a remote source via a communication module configured to communicate with the microcontroller. In some instances, the method further includes filtering, via a DC filter, the rectified DC power output by the digital rectification module. In some cases, generating the at least one DC power based on the rectified DC power and the PWM signal and supplying the at least one of DC power to the solid-state light source are performed via a DC-to-DC converter.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A system for controlling the dimming of a solid-state light source, the system comprising:
    a digital rectification module configured to rectify a phase-cut alternating current (AC) signal into:
        a rectified direct current (DC) power; and
        a rectified phase-cut signal; and
    a microcontroller configured to receive the rectified phase-cut signal, wherein the microcontroller is configured to:
        measure, within a given period, a duration of a low state of the rectified phase-cut signal and output a low value based thereon;
        measure, within the given period, a duration of a high state of the rectified phase-cut signal and output a high value based thereon; and
        generate a signal based on at least one of the low value and the high value.

2. The system of claim 1, wherein the signal is a pulse-width modulation (PWM) signal.

3. The system of claim 2, wherein the microcontroller is further configured to:
    compare the low value and the high value against an accepted low value and an accepted high value, respectively; and
    generate the PWM signal based on at least one of the low value, the high value, the accepted low value, and the accepted high value.

4. The system of claim 3, wherein the microcontroller is further configured to:
    store the accepted low value and the accepted high value of the rectified phase-cut signal;
    compare the low value against a half-cycle period of the rectified phase-cut signal;
    compare the high value against the half-cycle period of the rectified phase-cut signal;
    reset the low value with the accepted low value if the low value exceeds the accepted low value; and
    reset the high value with the accepted high value if the high value exceeds the accepted high value.

5. The system of claim 2, wherein the microcontroller is further configured to communicate with a remote device external to the system, wherein the microcontroller is further configured to generate the PWM signal based on input received via the remote device.

6. The system of claim 1, wherein the digital rectification module comprises an input circuit and AC rectifier configured to receive the phase-cut AC signal from a phase-cut dimmer.

7. The system of claim 6, wherein the digital rectification module further comprises:

an isolation element electrically coupled in series with the input circuit and AC rectifier;
a conditioning diode electrically coupled in series with the isolation element; and an isolation diode electrically coupled in series with the input circuit and AC rectifier and in parallel with the isolation element.

8. The system of claim 1, wherein the microcontroller is configured to utilize zero-crossing detection in measuring each of the duration of the low state and the duration of the high state of the rectified phase-cut signal.

9. The system of claim 1, wherein:
    the duration of the low state is measured starting at a falling edge of the rectified phase-cut signal; and
    the duration of the high state is measured starting at a rising edge of the rectified phase-cut signal.

10. The system of claim 1, further comprising a DC-to-DC converter configured to:
    receive the rectified DC power from the digital rectification module;
    receive the signal from the microcontroller; and
    generate at least one DC power based on the rectified DC power and the signal and supply the at least one DC power to the solid-state light source.

11. A method of controlling light output of a solid-state light source, the method comprising:
    rectifying a phase-cut alternating current (AC) signal into:
        a rectified DC power; and
        a rectified phase-cut signal;
        measuring a duration of each of a low state and a high state of the rectified phase-cut signal and outputting a corresponding low value and high value, respectively;
    generating a pulse-width modulation (PWM) signal based on each of the low value and the high value of the rectified phase-cut signal; and
    generating at least one direct current (DC) power based on the rectified DC power and the PWM signal and supplying the at least one DC power to the solid-state light source.

12. The method of claim 11, wherein rectifying the phase-cut AC signal is performed via a digital rectification module comprising an input circuit and AC rectifier configured to receive the phase-cut AC signal from a phase-cut dimmer.

13. The method of claim 12, wherein the digital rectification module further comprises:
    an isolation element electrically coupled in series with the input circuit and AC rectifier;
    a conditioning diode electrically coupled in series with the isolation element; and
    an isolation diode electrically coupled in series with the input circuit and AC rectifier and in parallel with the isolation element.

14. The method of claim 11, wherein measuring the duration of each of the low state and the high state of the rectified phase-cut signal and outputting the corresponding low value and high value are performed via a microcontroller configured to receive the rectified phase-cut signal, wherein the microcontroller comprises:
    a timer module configured to:
        measure, within a given period, the duration of the low state and output the low value based thereon; and
        measure, within the given period, the duration of the high state and output the high value based thereon; and a half-cycle checking module configured to compare the low value and the high value against an accepted low value and an accepted high value, respectively.

15. The method of claim 14, wherein generating the PWM signal based on each of the low value and the high value of the rectified phase-cut signal is performed via the microcontroller, wherein the microcontroller further comprises:
a PWM module configured to generate the PWM signal based on at least one of the low value, the high value, the accepted low value, and the accepted high value.

16. The method of claim 14, wherein the timer module is configured to utilize zero-crossing detection in measuring each of the duration of the low state and the duration of the high state of the rectified phase-cut signal.

17. The method of claim 14, wherein the half-cycle checking module comprises:
a storage module configured to store the accepted low value and the accepted high value of the rectified phase-cut signal;
a comparing module configured to:
compare the low value against a half-cycle period of the rectified phase-cut signal; and
compare the high value against the half-cycle period of the rectified phase-cut signal; and
a resetting module configured to:
reset the low value with the accepted low value if the low value exceeds the accepted low value; and
reset the high value with the accepted high value if the high value exceeds the accepted high value.

18. The method of claim 11, wherein:
the duration of the low state is measured starting at a falling edge of the rectified phase-cut signal; and
the duration of the high state is measured starting at a rising edge of the rectified phase-cut signal.

19. A system for controlling the dimming of a solid-state light source, the system comprising:
a digital rectification module comprising:
an input circuit;
an AC rectifier configured to receive the phase-cut AC signal from a phase-cut dimmer;
an isolation element electrically coupled in series with the input circuit and AC rectifier;
a conditioning diode electrically coupled in series with the isolation element; and
an isolation diode electrically coupled in series with the input circuit and AC rectifier and in parallel with the isolation element,
wherein the digital rectification module is configured to rectify a phase-cut alternating current (AC) signal into:
a rectified direct current (DC) power; and
a rectified phase-cut signal; and
a microcontroller configured to receive the rectified phase-cut signal, wherein the microcontroller is configured to:
measure a duration of a state of the rectified phase-cut signal and output a value thereon; and
generate a signal based on the value.

20. A method of controlling light output of a solid-state light source, the method comprising:
rectifying a phase-cut alternating current (AC) signal into:
a rectified DC power; and
a rectified phase-cut signal,
wherein rectifying the phase-cut AC signal is performed via a digital rectification module comprising: an input circuit, an AC rectifier configured to receive the phase-cut AC signal from a phase-cut dimmer, an isolation element electrically coupled in series with the input circuit and AC rectifier, a conditioning diode electrically coupled in series with the isolation element, and an isolation diode electrically coupled in series;
measuring a duration of at least one state of the rectified phase-cut signal and outputting a value;
generating a signal based on the value of the rectified phase-cut signal; and
generating at least one direct current (DC) power based on the rectified DC power and the signal.

* * * * *